April 10, 1934.                J. B. ADAMS                     1,954,033
                         CUSTOMER CONTROL DEVICE
                         Filed Feb. 24, 1930        4 Sheets-Sheet 1
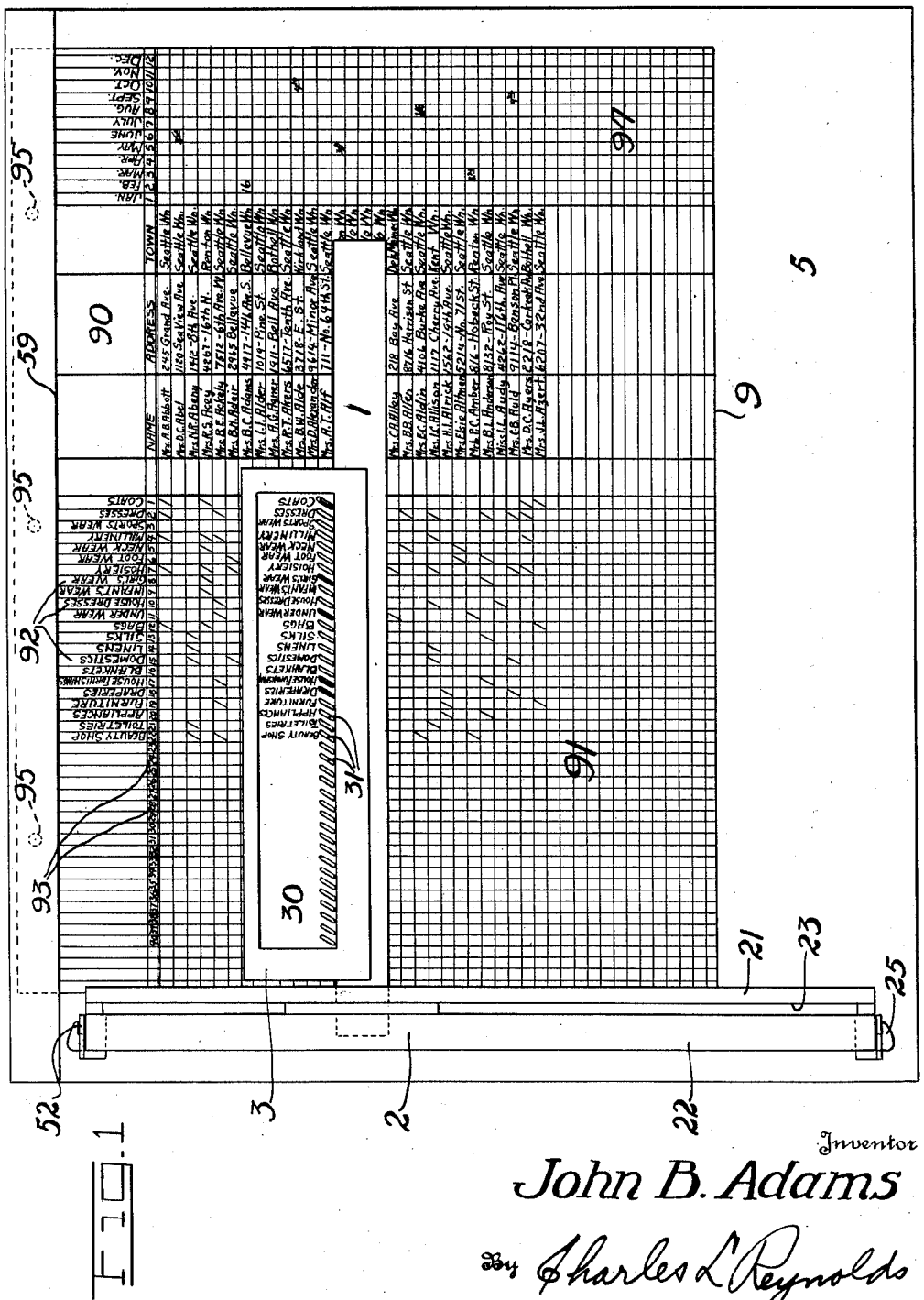
Inventor
John B. Adams
By Charles L. Reynolds
Attorneys April 10, 1934.    J. B. ADAMS    1,954,033
CUSTOMER CONTROL DEVICE
Filed Feb. 24, 1930    4 Sheets-Sheet 2

Inventor
John B. Adams
By Charles L. Reynolds
Attorney

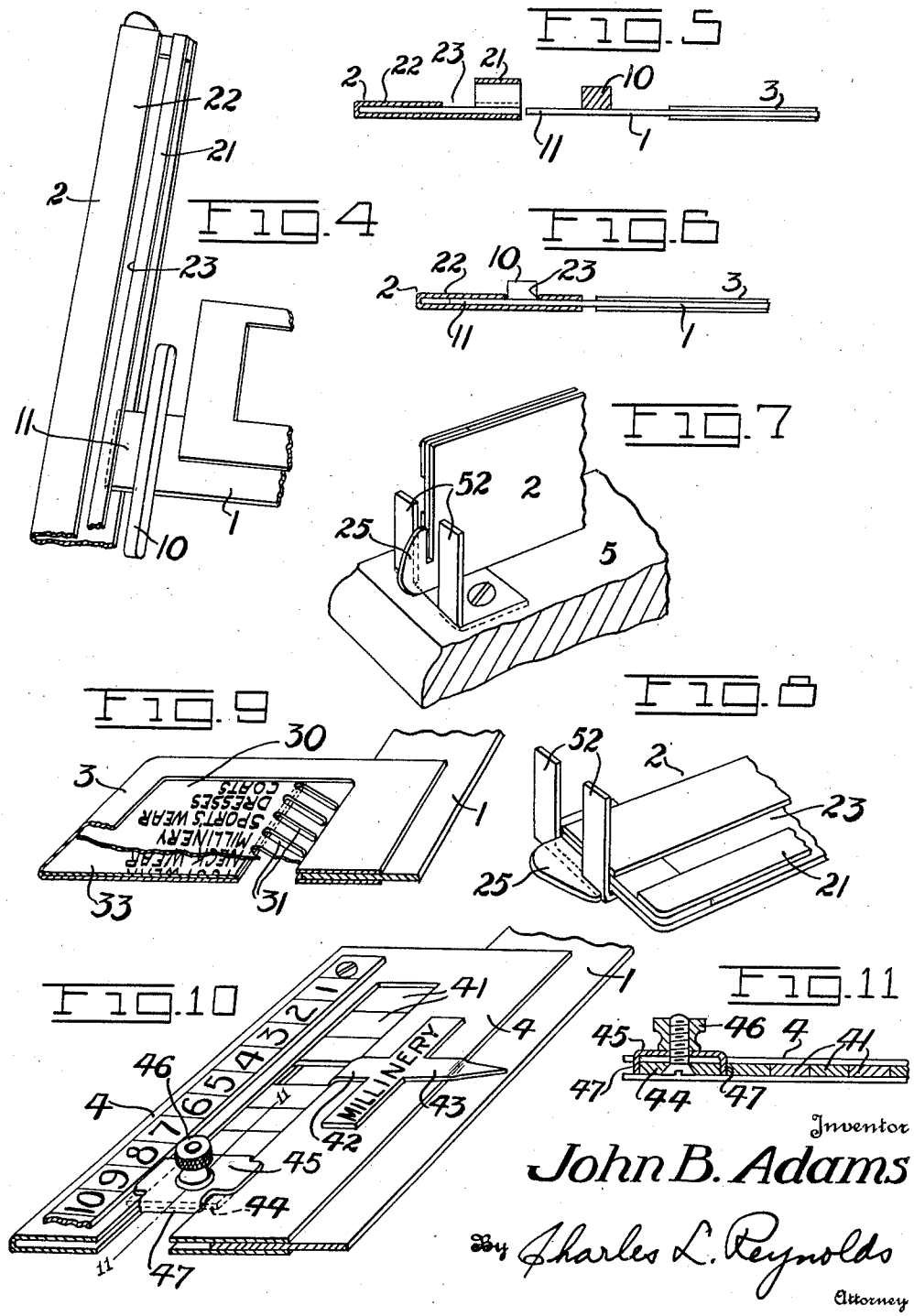

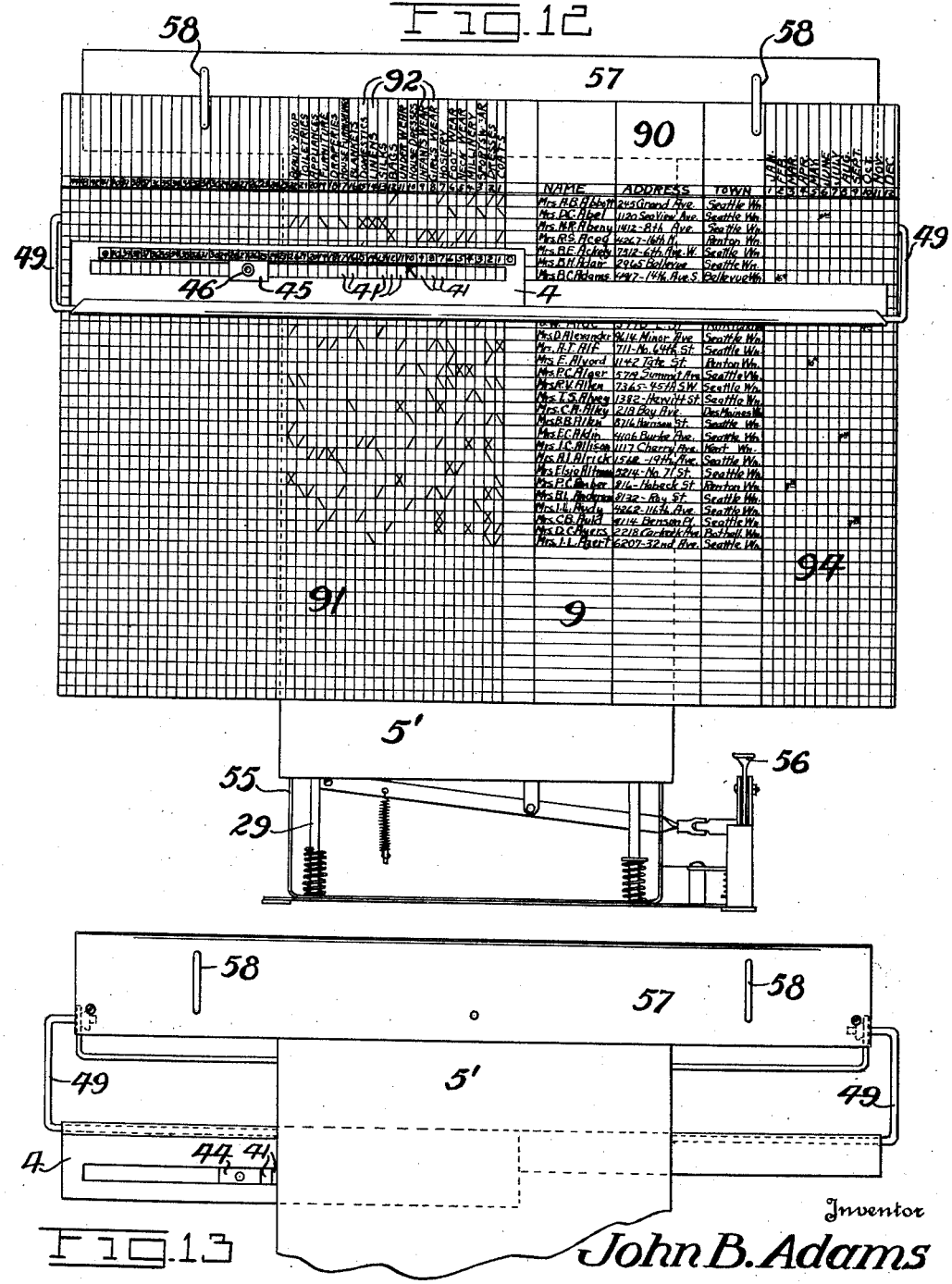

Patented Apr. 10, 1934

1,954,033

UNITED STATES PATENT OFFICE 1,954,033

CUSTOMER CONTROL DEVICE

John B. Adams, Seattle, Wash., assignor to Customer Control Service Corporation, Seattle, Wash., a corporation of Washington Application February 24, 1930, Serial No. 430,544

8 Claims. (Cl. 120—33)

My invention relates to devices for condensing, preserving, marking, reading and comparing of records or data of various sorts. It is most particularly intended for the operation of customer control systems for department stores, but it will be evident as the description progresses that it may be employed in conjunction with the making, reading and comparison of records of various types, and it is not restricted in use to customer controls, although in this field it is believed its greatest usefulness will be found.

A customer control system is a means of recording the purchases of customers, and more especially the recurrence or non-recurrence of purchases, usually in the several departments of a store, to the end that the customer's account may be retained and built up, and whereby customers purchasing from one department may be induced to make purchases in other departments, usually in departments related to those in which their previous purchases have been made. It is a means of making statistics available for analysis, and for directing mail advertising in the channels where it will meet the most ready response, rather than sending it out broadcast.

It is now accepted as axiomatic in retail merchandising that growth of sales comes not so much from the outside customer who is induced to make purchases, but rather from the customer who has already made a purchase and who can be induced to renew such purchases from time to time, or to patronize other departments. It is also a well-known principle of merchandising that customer accounts will drift from one store to another, unless appeals attractive to this individual account are made from time to time, with a view to retaining the account and inducing further purchases. However, it is equally important that the customer shall not be importuned to buy that which she has recently bought from that same store. Accordingly, it becomes most important, from time to time, to learn whether or not a particular account is making such purchases as might be reasonably expected, either in the department wherein purchases were previously made or in related departments, and it is most important that appeals and advertising matter be addressed to such customers as have not made the expected purchases, with a view to retaining and improving their accounts.

As such accounts are kept in ledgers, it is an extremely difficult matter and involves the employment of a large accounting force properly to compare these several accounts and to determine to which of them appeals and advertising matter should be sent, and to which of them they should not be sent, for it is obvious that appeals sent to customers who have already maintained a satisfactory amount or volume of purchases is not only wasted effort, but reacts unfavorably upon the store which sends out appeals to a customer who has already made such purchases as might reasonably be expected. Accordingly, my invention has for its chief object the provision of a system and mechanism for carrying out the same, whereby readily available and easily compared records can be kept with a minimum of clerical help, indicating at a glance the status of each particular account and of many accounts in comparison, whereby statistical data can be quickly gleaned and whereby indications may automatically be made to a clerk who is engaged in mailing advertising matter, and those who might be offended or who could not again be induced to purchase do not receive the particular advertising matter in question.

Associated with this general object it is, of course, a further object to provide such means as are generally described above, which are simple both in construction and in operation, and particularly which may be operated both for keeping the records and for reading and interpreting the same by clerks of even limited experience and training, without the likelihood of error.

Other objects, and more especially such as relate to the more strictly mechanical details of my invention, will be determined from a study of the accompanying drawings, of this specification and of the claims which terminate the same.

My invention comprises the novel devices and the novel arrangement and association thereof, relative to each other, as shown in the drawings, described in this specification and as will be defined by the claims terminating the same.

In the accompanying drawings I have shown my invention, both the marking and reading devices, in forms which are now preferred by me, it being understood that changes thereof may be made within the scope of the claims without departing from my invention.

Figure 1 is an elevation of my device arranged for the first markings.

Figure 2 is a similar view of the device, with parts broken away, showing it arranged for a subsequent marking.

Figure 3 is a similar view of my device, arranged now for reading.

Figure 4 is a detailed perspective view, showing my device in the course of changing from one style of device to the other, that is, in the act of inserting the marking device in place.

Figure 5 is a transverse section through the parts in the position shown in Figure 4, and Figure 6 is a similar view of the same parts, shown in their final position, ready for use.

Figure 7 is a perspective view of a detail of the mounting of the guide means forming part of my device, and Figure 8 is a similar view of the same, shown in position of use.

Figure 9 is a detailed view, in perspective, parts being broken away and shown in section, illustrating my marking device in one position of use.

Figure 10 is a view similar to Figure 9, showing my reading device in position of use.

Figure 11 is a longitudinal sectional view through my reading device, substantially on the line 11—11 of Figure 10.

Figure 12 is a view of a modified form of my reading device, arranged for typewriter addressing of envelopes, and Figure 13 is a similar view thereof, with parts broken away, showing the device in position to receive a sheet.

It is desirable that a department store have readily available records of the purchases of each account, and it is reasonable to assume that each customer, if satisfied, will from time to time make further purchases in the same department and in related departments, or can be induced to make such purchases. For instance, a given customer may purchase a coat in the spring, and may be considered a prospect for a coat in the fall. The same customer may also be considered a prospect for dresses, but if this customer purchases dresses and coats, it is not reasonable to suppose that she will purchase silks, domestics or dress goods. Vice versa, if a customer purchases dress goods, silks and the like, it is not reasonable to suppose that she is a prospect for ready-to-wear dresses, for the indications are that she makes her own dresses. Similarly, the customer who purchases hosiery should be a prospect for shoes; a customer who, in the recent past, has purchased furniture, draperies and house furnishings can not be considered a prospect for such goods, but one who has made purchases in other departments of the store might be induced to purchase furnishings, draperies and furniture, because of the reputation of the store and her acquaintance therewith gained through contact with other departments. If the record shows that customers do not purchase a second time, it is necessary to ascertain why, but first it must be determined whether or not they do make further purchases in a given department.

Accordingly, I have designed my device in such a way that sales managers and store officials can tell at a glance whether some accounts are purchasing what might reasonably be expected from them, whether purchases have been made in the recent past, or whether the account is inactive, and can obtain statistical data as to the number of repeat purchases in any given department, so as to concentrate attention on departments which are shown to require it, and upon accounts which show danger of becoming inactive. Or, attention can be focused upon accounts which are active in one department, but which have not made purchases in other departments. The record may be kept in such a way as to show the grade of merchandise favored by each customer, so that when a special offering of $75 dresses is to be made, notices will not be sent to those whose purchases are in the range of $25 dresses, from whom but slight response can be expected.

My invention includes as its basis a record sheet 9, which is ruled into columns and lines. In one section, indicated at 90, are spaces for names and addresses of customers. In another section 91 the several columns are provided with suitable headings, either written out as indicated at 92, to take in the various departments of the store, or a key or code may be used, as is indicated at 93, by means of which the different departments, or perhaps the different grades of merchandise, are indicated by code figures or letters. There may also be a section, as indicated at 94, for other information pertaining to an account, as for instance, a credit tickler, whereon may be indicated accounts which have not been paid up on time.

As an illustration of the record section 91, it may be noted that there is included, among the headings 92, various departments of the store, usually with related departments placed in adjacent columns. Thus, coats and dresses, which are the two most important departments of a store, are placed in the first two columns. Sportswear and millinery are placed near them. Hosiery and footwear are placed in adjoining columns. Silks, linens and domestics are placed in adjoining columns, as are furniture, draperies, house furnishings and appliances. Accordingly, it is a simple matter to determine, when the record has been properly marked, as will be brought out hereafter, in which department any particular customer is making purchases. Thus, by reference to Figure 1, it may be seen that Mrs. Acey has made purchases of a coat, of millinery, of neckwear, of hosiery, of girl's wear, of infant's wear, of bags, but has not make any purchase, for instance, of footwear. Having purchased hosiery, she would be a good prospect for the purchase of footwear. Having purchased a coat, it would be reasonable to suppose that she might be induced to purchase a dress, and if a selling campaign in the footwear department or in the dress department were to be conducted, it would be a matter of good business to send out an announcement to Mrs. Acey. The record shows that Mrs. Acey does not purchase domestics, linens or silks, which indicates that she does not make her own dresses, and this would all the more indicate that she was a live prospect for dresses.

It is necessary, of course, to hold the record sheet 9 in some fixed position while it is being marked, and while it is being read, and I have provided it with a series of holes 95, through which pins (not shown) may be placed to fix the sheet to a support 5, generally in the form of a board with a flat upper surface. Any suitable means may be employed to hold the sheet fast to the board or support 5, and I may employ a metallic bar indicated at 59, which incidentally, may carry the hold-down pins by which the sheet 9 is fixed in position.

For marking on the sheet 9 various means may be employed, but generally these would include a straight-edge 1, which is guided in some manner relative to the holes 95, which fix the position of the sheet 9. For example, then, a guide means 2 may be provided along one edge of the support 5. This may consist of a metallic sheet folded (see Figures 4 to 8 inclusive) the two parts of which are spaced slightly from each other. The upper portion may be formed as two strips, the front strip 21 and a rear strip 22, spaced from each other to leave a slot 23, which is the true guide. The straight-edge 1 is formed at its end with a crossbar 10 and with a projecting toe 11. By springing the resilient strip 21, the crossbar 10 may be passed under the same, and eventually will be seated in the slot 23. The first step may be seen in Figure 5 and the last in Figure 6. Thus held, the straight-edge 1 may be traversed over the support 5 and the sheet 9, held thereon, in a direction parallel to the columns on the sheet. The straight-edge would, of course, be held parallel to the lines of the sheet.

The guide means 2 may be held in such a position as to permit its pivoting, and to this end I have shown it as provided with a hook 25, which normally engages upstanding fingers 52 on the support, but which permit swinging of the same, usually for the purpose of inserting or removing the record sheet 9. The edge of the guide means 2 overlies the edge of the sheet and helps to hold it down.

Supported upon the straight-edge 1, at a location to coincide with the record section 91 of the sheet, is a marking device. As shown, this comprises a frame 3, carrying a card or shield 30, having various marking apertures 31 arranged according to some selected code. As shown, these are merely inclined in one direction, but various types of apertures and various shapes, positions or inclinations might be employed, and each might have a meaning distinct from the others. It might be feasible to make the apertured shield 30 an integral part of the frame 3, but I prefer that it be separate therefrom, and inserted within the frame 3 in such a way as to permit its withdrawal through the end of the frame. Either end of the frame might be left open for this purpose. I prefer also that an accompanying code card 33 be employed in association with the apertured shield 30, and that the shield 30 be transparent, as for instance, of celluloid. On the code card 33 may be placed indications corresponding to the headings of the several columns at 92, either the words written out or the code figures or letters which refer to the particular departments, and thus, each aperture 31 corresponds to its particular one of the columns in the record section 91.

As the clerk goes through the ledger account for a day, she notes that Mrs. Alf, for instance (see Figure 1), has made purchases in the drapery department, in the house furnishings department, in the underwear department, in the girls' wear department and in the coat department. She therefore draws a line through the corresponding aperture 31 for each of these departments, with the straight-edge 1 placed opposite Mrs. Alf's name. There is recorded in this way the fact that Mrs. Alf has made the purchases. Now, at a later date, say in the next accounting period, it may be that Mrs. Alf has made other purchases, and in order to indicate these, various devices may be employed. Different colors may be used, or different positions, which can be controlled by using a suitably perforated shield 30. However, it is quite convenient simply to take out the shield 30 and reverse its position to bring the aperture 31 to the opposite inclination, and this has been shown in Figure 2. This would not be done for each name, but the shield would be reversed on given dates. We now find that Mrs. Alf, in the period corresponding to that in which the apertures 31 were so inclined, has made purchases in the hosiery and footwear departments, in the domestics department and has again purchased a coat. This has all been accomplished merely by marking, according to the ledger from time to time, and by reversing the inclination of the apertures 31 corresponding to a further period, either a following month, or a following year, whatever may be the desire of the store officials.

Obviously, it would be difficult for an operator to follow through the various indications on the record section of the sheet and to interpret them without liability to serious error, without mechanical aids. I have therefore provided a reading device, as a shield to cover columns not pertinent at any given time, which corresponds largely to the marking device, in that it is mounted upon the straight-edge 1, or upon a similar straight-edge, which may be substituted in the guide means 2 for the marking device. Such a reading device may consist of the shield or frame 4, formed as a channel intersected by an aperture within which channel, in alignment with the aperture, are held a series of shutter members 41. They may be slipped into place through the aperture, then twisted about into proper position. As many of these shutter members would be used as would be necessary to cover over and shut out from view such columns as it is not desired to read. Thus, in Figure 3, analysis is being made of the silks department, and only the silks column, or number 13, is visible. To space the shutters so that the reading aperture is left, a spacer member 42 is employed, this being received in one side of the channel of the frame 4 to leave the reading aperture free and to space the shutters at either side thereof. Preferably, this spacer member has on it the indication of the department which is being analyzed or read, and likewise, I prefer that it have a pointer 43, which extends over the straight-edge to point to the column being read, so that as the straight-edge is moved down over the column, it will indicate to the operator a mark or a lack thereof in a name soon to come up into reading position at the top of the straight-edge, and thus the operator may be warned in advance of some item of which she should take notice. To secure the several shutters 41 in position, a clamping device, consisting of the underplate 44 guided in the two sides of the frame 4, and a clamping plate 45, clamped thereto by a clamping nut 46, may be employed (see Figures 10 and 11). The clamping plate 45 may have downwardly depending fingers 47, by means of which the clamping device is held in proper position without binding.

It is believed that the manner of using the device will now be clear. The manner of marking has already been described. When it is desired to conduct a campaign in the silks department, for instance, the reading device is placed in position, and as the girl runs down the record sheet, she sends one type of letter, for instance, to all whose accounts show they have formerly purchased silks, but who have not recently done so. She omits letters to those who have recently bought silks, and she may send a different letter to those who have never bought silks at all, unless perhaps the indications in the dress column or in such a related column may show that the customer is not a good prospect for silks. In order that this may appear, it may be desirable to provide other spacer members which will space the shutters over the dress column, so that a letter will be sent only in case the customer who has not purchased silks has not also purchased dresses. The girl observing the indication of a customer to whom a letter should be sent may prepare an addressograph plate so that a proper letter will be addressed to this customer, without removal of the plate from its tray, or she may immediately type an envelope in which the letter will be sent to this customer.

The larger stores would usually be provided with an addressograph system, or like mechanical means, but for smaller stores, it is desirable to provide a means whereby the reading may be carried out by a stenographer seated at a typewriter who will immediately address envelopes to those to whom letters are to be sent, and for this purpose I have shown the reading device of Figures 12 and 13. In this case, the support 5′ is itself movable upon fixed guides 29. The record sheet 9 is held in position by rings or staples 58 carried upon an extension cross member 57, secured to the movable support 5′ at the top. The reading frame 4, in this instance, is carried upon a fixed support 55, as by means of the links 49, by means of which it can be swung to the rear of the support 5′ to permit the insertion or removal of a sheet. Movement of the support 5′ is under the control of a lever 56, suitably connected to the support. It may be noted that the arrangement shown herein is identical in mechanical construction to that put out for the use of stenographers to hold notebooks, papers and the like for copying or typing, and known as the Line-A-Time machine. By the use of this the reading frame 4 being held stationary and the support and record sheet being movable upwardly, the stenographer may move the record sheet one name at a time and may make such copies or address such envelopes as the record shows to be necessary.

What I claim as my invention is:

1. A marking device for use in conjunction with a record sheet ruled in lines and columns, and means guiding the marking device for movement over the sheet to expose successive lines, said device comprising a straight-edge adapted to extend over the sheet, parallel to the lines, and a shield thereon perforated according to a selected code, the perforations being spaced by the width of a column on said sheet.

2. A reading device for use in reading a record sheet ruled in columns comprising a frame, column-width shutters slidable longitudinally of said frame, a column-width spacer insertible at one side of said frame, between shutters, and means to retain the shutters and spacer in selected position in said frame.

3. A device of the character described, comprising a straight-edge adapted to be moved over a record sheet ruled in lines and columns through positions always parallel to the lines, a cross bar at one end of said straight-edge, a guide adapted to be fixed in position relative to the columns of the record sheet, said guide including a resilient strip and a complemental strip parallel to and spaced from said resilient strip, said cross bar being insertible in said guide, between said two strips, by springing the resilient strip.

4. A marking device for use in conjunction with a record sheet ruled in lines and columns, means guiding the marking device for movement over the sheet to expose successive lines, said device comprising a support adapted to extend over the sheet and a shield removably positioned therein, whereby such shield may be reversed, said shield being perforated according to a selected code, the perforations extending in a line parallel to the lines of the sheet, and spaced by the width of a column.

5. The combination of claim 4, the support constituting part of the marking device including a frame open at one side, the shield being formed as a separate card normally held in said frame and slidable through said open side for replacement, substitution, or reversal.

6. A reading device for use in conjunction with a record sheet ruled in lines and columns, including a straight edge and means guiding the same for traversing movement over the sheet in a direction parallel to the columns to expose successive lines, said device further including an apertured frame mounted on said straight-edge, shutters of the width of a column, and a column-width spacer positioned to avoid obscuring the column to be read, and means to secure said shutters and spacer in predetermined positions to enable reading of a selected column.

7. A reading device for use in conjunction with a record sheet ruled in lines and columns and means guiding the reading device for movement over the sheet to expose successive lines, said device comprising a straight edge, adapted to extend over the sheet parallel to the lines, and a shield mounted on said straight edge and including a plurality of shielding members and a spacer relatively adjustable to provide a perforation, arranged according to any selected code, to expose the width of a column on said sheet.

8. A reading device for use in conjunction with a record sheet ruled in lines and columns, including a straight-edge, and guide means guiding the same for traversing movement over the sheet in a direction parallel to the columns to expose successive lines, said device further including an apertured shield mounted on said straight-edge and closing means partly closing said aperture to define a lesser aperture therein in registry with a selected column on the sheet, portions of the remaining columns of a selected group being covered by said closing means and an indicator carried by said reading device, and positioned to indicate data in the selected column in advance of its appearance in the lesser aperture.

JOHN B. ADAMS.